April 23, 1940.                L. H. PECK                2,197,897
                                WIRING BOX
                            Filed July 9, 1938              2 Sheets-Sheet 1
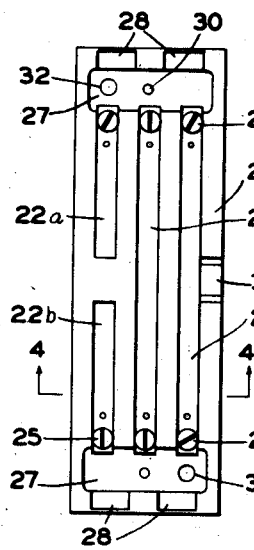
FIG.-3
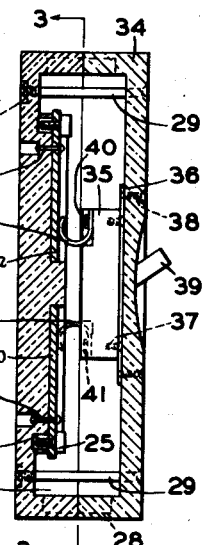
FIG.-2
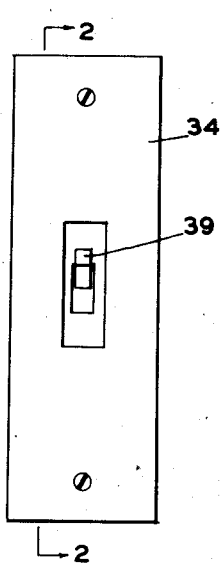
FIG.-1
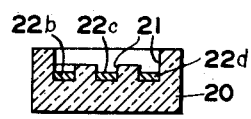
FIG.-4
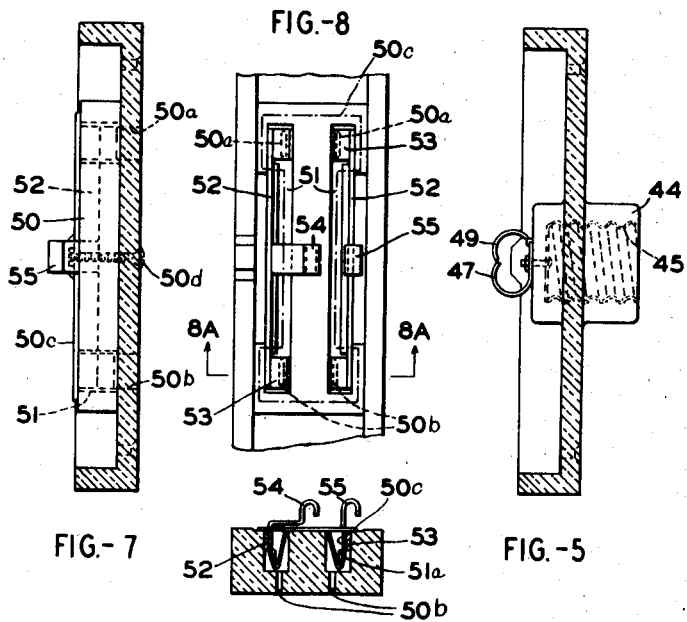
FIG.-8
FIG.-7
FIG.-8A
FIG.-5
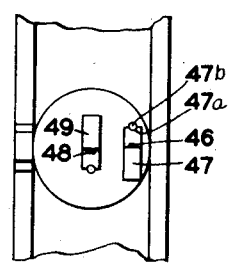
FIG.-6
INVENTOR
LEE H. PECK
BY
*Hyde, Higley & Meyer*
ATTORNEYS April 23, 1940.   L. H. PECK   2,197,897
WIRING BOX
Filed July 9, 1938   2 Sheets-Sheet 2

INVENTOR
LEE H. PECK
BY
ATTORNEYS

Patented Apr. 23, 1940

2,197,897

UNITED STATES PATENT OFFICE 2,197,897

WIRING BOX

Lee H. Peck, Chagrin Falls, Ohio, assignor to Porcelain Products, Inc., Findlay, Ohio, a corporation of Delaware Application July 9, 1938, Serial No. 218,339

2 Claims. (Cl. 173—330)

This invention relates to a novel wiring box for use in open wiring systems.

The invention provides a two-part box having a standard base housing a plurality of bus bars and interchangeable with different types of tops or covers which carry integrally with the top a lamp socket, a convenience outlet, a switch box or a rosette junction box or drop cord, or indeed any other type of fixture or outlet which is normally connected to the power line.

Other forms of my device are shown in my copending applications Serial Nos. 245,138 and 245,139, filed December 12, 1938, and Serial Nos. 252,282 and 252,283, filed January 23, 1939.

Figure 10:
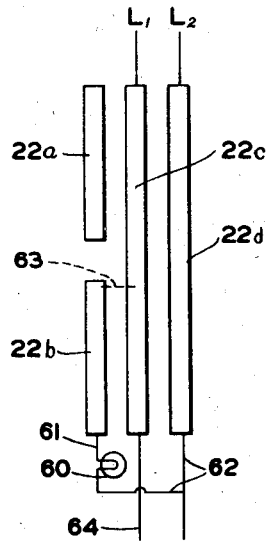
Figure 9:
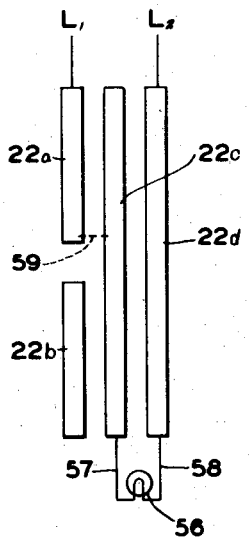
Figure 12:
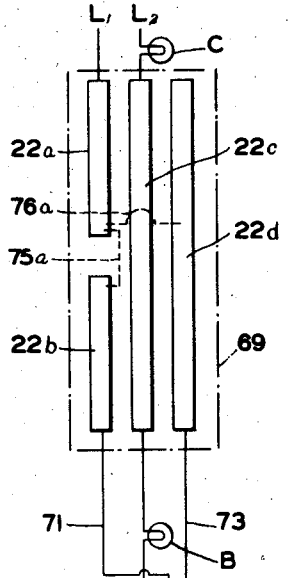
Figure 13:
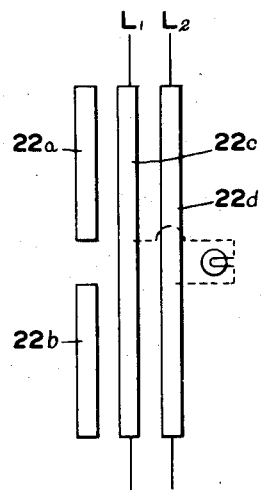
Figure 11:
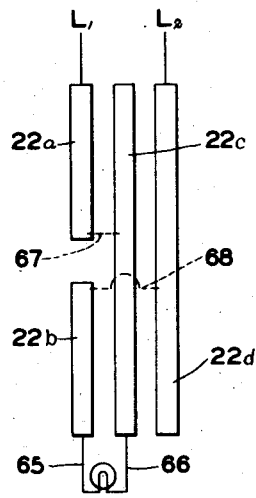

Fig. 1 shows a top plan view of a wiring box embodying my invention wherein the cover is equipped with a switch; Fig. 2 is a longitudinal section taken along the line 2—2 of Fig. 1; Fig. 3 is a top plan view of the base taken along the line 3—3 of Fig. 2; Fig. 4 is a sectional view taken along the line 4—4 of Fig. 3; Fig. 5 is a longitudinal section slightly off center of a cover equipped with a lamp receptacle; Fig. 6 is a bottom plan view of the lamp receptacle of Fig. 5; Fig. 7 is a longitudinal section slightly off center of a receptacle cover equipped with a convenience outlet; Fig. 8 is a partial bottom plan view of the convenience outlet of Fig. 7 with a part removed to show the construction; Fig. 8A is a sectional view along the line 8A—8A of Fig. 8; Fig. 9 is a wiring diagram showing the use of my wiring box in connection with the single pole switch of Figs. 1 and 2; Fig. 10 is a similar view showing the single pole switch where it is desired to feed a power device through and beyond the switch; Fig. 11 is a diagrammatic layout showing the use of the device with a double pole switch; Fig. 12 is a wiring diagram showing the use of two of my devices in a three-way switch hook-up; while Fig. 13 shows the use of my device with a lamp receptacle or with a convenience outlet.

Referring to Fig. 1, I have provided a wiring box made up of an insulating material, preferably of porcelain, phenolic condensate or the like, and designed sufficiently narrow to fit on the narrow edge of a two-inch joist or stud. For instance, the device shown may have an over all width of 1¾ inches, a height of 1⅜ or 1½ inches and a length of 5½ inches. Within the small confines of this space I have assembled all of the parts necessary to make the various connections outlined hereinafter. This is done by a novel arrangement of the parts so that while fulfilling all practical requirements and making connections cheap and easy, nevertheless the requirements of the fire underwriters are met.

Referring more particularly to Figs. 1 to 4, the base 20 is provided with a plurality of grooves 21 of which I have shown three arranged parallel and running lengthwise of the base, these grooves being about ¼ inch wide and leaving approximately ⅛ inch of raised porcelain between adjacent grooves. In the bottom of each groove are placed suitable metal strips of copper or the like forming bus bars 22a and 22b in one groove and 22c and 22d in the other grooves. These bars are suitably secured in place as by means of rivets 23 passing through suitable openings in the base which are countersunk at the bottom with the usual filling of pitch or the like covering the exposed heads at the bottom. Each bus bar is supplied with a connection screw 25 for making wire connections to the bar, these screws entering suitable clearance openings 26 in the base. At each end of the series of bus bars there is provided a pocket 27 into which the lead-in cables enter and facilitating the connection of the individual wires to the connecting screws 25. As is usual in such cases the fittings are not provided with any certain number of openings for lead-in wires but a plurality of knock-out portions 28 are provided where the material of the base is very thin so that they are easily broken through, supplying the number of outlet wiring openings necessary in any given installation.

The cover 34 is adapted to coact with the base and to completely enclose the parts therein. The central portion of the cover is spaced from the base and carries an electrical device adapted to coact with the conductors in the base. Various devices may be secured to the covers, which are interchangeable with the common base. As will presently appear, each electrical device carries contactors which make electrical connection with the bus bars in the base solely by the securing of the cover to the base. As best seen in Figs. 2 and 3, suitable means is provided for securing the cover on the base, as for instance the arrangement of bolts 29, one at each end of the box having countersunk French heads and adapted to pass through openings 30 and to be secured in grommets 31 in the base. Openings 32 may be supplied, one at each end of the base through which securing means may be passed to attach the box to a supporting surface. Means is provided for insuring the proper positioning of the cover on the base and to this end I may provide a notch 33 in one side of the base and an interfitting key member on the cover.

In Figs. 1 and 2 I have shown the combination of my novel base with a single pole snap switch of a standard type. Since any standard switch may be used in this fashion, I have not illustrated the details of the switch but instead have shown a switch box at 35 which is connected by means of a plate 36 to the inner face of the cover. This plate has two sets of holes for attaching screws, the screws 37 securing the switch box to the plate and the screws 38 securing the plate to the wiring box cover. The switch has the usual throw 39 which works in a hollow depression in the cover. To the terminals 40 and 41 of this switch I connect spring contact fingers 42 and 43, respectively, which are placed for instance one over bus bar 22a or 22b and the other over bus bar 22c. As will be later illustrated by wiring diagrams, upon throwing the switch bus bar 22a or (22b) may be electrically connected with the bar 22c by means of the switch 35.

Referring to Fig. 5 I have shown a cover interchangeable with the cover shown in Fig. 2 so that a lamp receptacle may be electrically connected with bus bars in the base 20 or one exactly like it. To this end I have formed a cup-shaped portion 44 in the central portion of the cover in which is secured a standard lamp thimble 45. This thimble may be of any standard type, for instance, the annular thimble shell may have bottom segment portions perforated for attachment by means of screws, rivets or the like, and the rivet 46 is shown passing through one of these segmental portions and riveting the thimble to the cover and at the same time electrically connecting the shell of the thimble with the spring contact finger 47. The central connection for the lamp contact is made by means of a rivet or bolt 48 passing through the central portion of the socket, insulated from the thimble shell and securing in place the spring contact finger 49. To prevent twisting of the contact fingers I have shown a detail of the connection of finger 47 and rivet 46 wherein a slight recess is formed at 47a on the end of the spring contact finger and a nubbin 47b is provided on the inner face of the cover adapted to enter the recess so as to hold the contact finger against any swinging motion. The same sort of connection may be provided on finger 49. The position of these contact fingers is indicated in Fig. 6 and as will be shown in a wiring diagram these fingers are adapted to lie exactly over bus bars 22c and 22d so that when the cover is secured to the base by means of the bolts 29 the lamp receptacle is electrically connected across those bus bars.

In Figs. 7 and 8 I have indicated a convenience outlet 50 which is of the type providing outlets at 50a and 50b for the attachment of extension cords or the like. This may be a standard convenience outlet secured to the cover but a stronger device is formed by making two separate pockets 51 in the porcelain cover. Each pocket has a shoulder 51a on which rests a metal bar 52. Electrically connected at each end of each bar are spring contact fingers 53 of the usual type housed in the end portions of pockets 51 and positioned to engage with the contact prongs of an extension cord adapted to enter through the openings 50a and 50b in the cover. To one bar 52 is attached the spring contact finger 54 and to the other bar 52 is connected the spring contact finger 55. These fingers are so formed and spaced that when the cover is positioned on the box base these fingers will make contact respectively with the bus bars 22c and 22d as illustrated in the wiring diagram of Fig. 13. A sheet 50c of insulating board is held in place by a centrally located bolt 50d and serves to keep all of the parts in position.

It will be noted in all the various cover devices that the contacts 42, 43, 47, 49, 54 and 55 are resilient in a direction transverse to the bars 22 in the base, and when any coacting cover is secured to the base by bolts 29, then the contacts carried by the cover are held in yielding contact with the conductors carried by the base.

In Fig. 9 I have shown a wiring diagram in which a line $L_1$ is connected to bus bar 22a and a line $L_2$ is connected to bar 22d at one end of the box. At the other end of the box a power consuming device 56 is connected between line 57 connected to bus bar 22c and line 58 connected with bus bar 22d. With a single pole switch in position on this base and adapted when thrown to make an electrical contact as shown in broken lines at 59, this wiring box connection will serve for the use of a single pole switch.

In Fig. 10 I show a connection adapted for use where a device is to be energized by use of a single pole switch but at the same time other power devices are fed through the switch. In this connection line $L_1$ is secured to bus bar 22c and line $L_2$ to bar 22d. A power using device indicated at 60 is then connected to bus bar 22b by line 61 and to bar 22d by line 62. The single pole switch is then positioned to make an electrical connection as indicated by the broken line at 63 and this will energize the power device 60 while the line 64 connected to the opposite end of bar 22c provides, with line 62 extended, a pair of power lines which will be fed through the switch box regardless of the position of the switch 63.

In Fig. 11 is a wiring diagram showing the use of my device with a double pole, single throw switch. Here $L_1$ is connected to bar 22a. $L_2$ is connected to bar 22d at the input side of the switch and lines 65 and 66 are connected to bars 22b and 22c respectively at the output end of the switch. A double pole switch may then be provided on the cover coacting with this base to make one connection as indicated in broken lines at 67 and another connection as indicated at 68.

In Fig. 12 I have shown a diagram utilizing two of my devices for use in a three-way switch connection. Here $L_1$ is connected to bar 22a of switch 69 and $L_2$ is connected to bar 22c thereof. Bars 22b, 22c and 22d of this switch are connected respectively to bars 22b, 22c and 22d of switch 70 by means of lines 71, 72 and 73 respectively. A power using device is connected beyond bars 22a and 22c of switch 70 at A or in line 72 at B or in line $L_2$ at C. At position A no other connection is necessary to make the device operate as hereinafter described, but at positions B and C it is necessary to provide a jumper 74 in switch 70 between bars 22a and 22c thereof as shown. The covers supplied with the boxes 69 and 70 have double throw switches which make connections in one position as indicated at 75a or 75b and in another position as shown at 76a and 76b. It results from this arrangement that if the switch at box 69 is in position 75a then throwing the switch into position 75b at box 70 will connect the power using device. Whereas if either switch is in the 76a or 76b position then upon throwing the other switch to a like position the power using device will be energized. This is the usual three-way switch connection.

In Fig. 13 I have shown a connection for a lamp receptacle or a convenience outlet. Here L1 and L2 are connected at both the input and output side of the switch with the bars 22c and 22d while the contact fingers 46 and 47 described in connection with Figs. 5 and 6 or the fingers 54 and 55 shown in Figs. 7 and 8 are diagrammatically shown here as contacting bars 22c and 22d respectively. Thus the lamp thimble or the convenience outlet is energized while the lines extend through the box for attachment therebeyond if desired.

Referring back to Fig. 5, the device there shown is for a keyless lamp receptacle but it will be understood that the same may be modified for a keyed receptacle by simply deepening the pocket 44 to accommodate the switch mechanism found in the base of the thimble of a keyed receptacle and in such a case an opening may be provided for the introduction of a pull chain or the like.

The advantages of my novel wiring box will be apparent to those skilled in the art. It provides a uniform type of outlet throughout the wiring no matter what the nature of the connection made. It is cheap to produce because the bases are uniform and comprise but a few parts simply formed and easily assembled. The cover parts are also cheap to produce because they utilize standard parts which are simply and easily secured in place on a cover of fairly uniform design and each cover is interchangeable with the standard base. Moreover each cover when secured in place automatically secures the device carried by the cover in proper electrical connection with the bus bars so that the device is easily wired up and substantially foolproof. By use of my device no feed-backs are necessary. No connections are necessary within each box except the connections to the screws 25 which are simply and easily made. There is no soldering of connections and no taping to be done.

My device represents a great saving to the trade because only one standard base need be stocked or provided on a job and the proper assortment of covers is easily selected to provide the number and type of outlets and connections necessary. Furthermore after the device is once installed in a system it is easy to change one type of outlet or connection to another type by simply removing the bolts 29 and attaching a different type of cover. It will be noted that the conductors or bus bars 22 in the base are of sufficient extent to cooperate with differently spaced contacts on the various covers.

What I claim is:

1. A wiring fixture comprising an elongated base block of dielectric material having front and back faces, said back face being adapted for engagement with a supporting surface, there being deformations in said block by which to secure said block to said supporting surface, a plurality of long flat bus bars secured in parallel relation to the front face of said block with their flat faces forward and with their longer dimension extending in the same direction as the longer dimension of said block, binding posts at the ends of said bars, said posts being close to the outermost front surfaces of said block whereby access thereto is easy, a cover block of dielectric material removably secured to said base block, said cover block carrying an electrical device having resilient contacts yieldingly engaging said bus bars when said cover block is moved against said base block in a direction normal to said bus bars, means for removably securing said blocks together and holding said contacts stressed, said blocks meeting each other at all points about their peripheries so that together they form a housing completely enclosing said bars and contacts, and there being knockout portions in the end portions of said housing for the introduction of electrical conductors for attachment to said binding posts, whereby with said base block secured to a supporting surface, conductors may be easily connected to said binding posts and various cover blocks having contacts lying within the area of said bus bars may be attached to or removed from said base block at will.

2. A wiring fixture comprising an elongated base block of dielectric material having front and back faces, and adapted for engagement with a supporting surface, there being deformations in said block by which to secure said block to said supporting surface, a plurality of long bus bars secured in parallel relation to the front face of said block with their longer dimension extending in the same direction as the longer dimension of said block, binding posts at the ends of said bars, said posts being close to the outermost front surface of said block whereby access thereto is easy, a cover block of dielectric material removably secured to said base block, said cover block carrying an electrical device having contacts engaging said bus bars when said cover block is moved against said base block in a direction normal to the length of said bus bars, means for removably securing said blocks together and holding said contacts engaged, said blocks meeting each other at all points about their peripheries so that together they form a housing completely enclosing said bars and contacts, and there being knockout portions in the end portions of said housing for the introduction of electrical conductors for attachment to said binding posts, whereby with said base block secured to a supporting surface, conductors may be easily connected to said binding posts and various cover blocks having contacts variously located with reference to the bus bars may be attached to or removed from said base block at will.

LEE H. PECK.